(12) United States Patent
Jacobs et al.

(10) Patent No.: US 9,978,081 B1
(45) Date of Patent: *May 22, 2018

(54) METHOD AND APPARATUS OF REQUESTING CUSTOMIZED LOCATION INFORMATION AT A MOBILE STATION

(71) Applicant: West Corporation, Omaha, NE (US)

(72) Inventors: Pamela J. Jacobs, Omaha, NE (US); Joel G. Mason, Omaha, NE (US); Andrew Lawrence Groothuis, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/496,385

(22) Filed: Apr. 25, 2017

Related U.S. Application Data

(63) Continuation of application No. 14/860,989, filed on Sep. 22, 2015, now Pat. No. 9,633,369, which is a continuation of application No. 14/644,240, filed on Mar. 11, 2015, now Pat. No. 9,143,895, which is a continuation of application No. 13/731,169, filed on Dec. 31, 2012, now Pat. No. 8,983,503, which is a continuation of application No. 12/941,342, filed on Nov. 8, 2010, now Pat. No. 8,412,235.

(51) Int. Cl.
| | | |
|---|---|---|
| H04W 24/00 | (2009.01) | |
| G06Q 30/02 | (2012.01) | |
| H04M 3/493 | (2006.01) | |

(52) U.S. Cl.
CPC ..... *G06Q 30/0259* (2013.01); *G06Q 30/0256* (2013.01); *G06Q 30/0267* (2013.01); *H04M 3/4936* (2013.01)

(58) Field of Classification Search
CPC ......... H04L 67/24; H04L 67/22; H04L 67/18; H04M 1/274516; G06F 17/30864; G06F 17/30867; G06Q 30/06; H04W 4/02; H04W 4/20
USPC ................... 455/456.3, 456.1, 560; 709/224
See application file for complete search history.

(56) References Cited

U.S. PATENT DOCUMENTS

| | | | |
|---|---|---|---|
| 6,278,993 B1 * | 8/2001 | Kumar | G06F 17/30867 707/708 |
| 7,693,752 B2 * | 4/2010 | Jaramillo | G06Q 30/02 455/456.1 |

(Continued)

FOREIGN PATENT DOCUMENTS

| | | | | |
|---|---|---|---|---|
| CA | 2774639 C | * | 11/2015 | ............. H04W 4/02 |
| EP | 1914677 A1 | * | 4/2008 | ......... G06F 17/3087 |
| WO | WO 9517711 A1 | * | 6/1995 | ............. G09B 5/065 |

Primary Examiner — Mahendra Patel
(74) Attorney, Agent, or Firm — Raffi Gostanian

(57) ABSTRACT

A method and apparatus of processing a call are disclosed. One example method may include receiving a request at a server for dealer information. The request may be initiated by a user via his or her mobile station. The example method may also include determining whether there is user preference information and user location information included in the request. The information may be used to limit the amount of search results to increase relevancy. The method may also include searching a database for at least one dealer based on the user preference information and the user location information, and transferring the at least one dealer information to the user.

14 Claims, 6 Drawing Sheets

(56) References Cited

U.S. PATENT DOCUMENTS

| | | | |
|---|---|---|---|
| 7,797,204 B2* | 9/2010 | Balent | G06Q 30/0633 705/26.8 |
| 2001/0026240 A1* | 10/2001 | Neher | G01S 5/0018 342/357.75 |
| 2003/0050865 A1* | 3/2003 | Dutta | G06Q 30/02 705/26.61 |
| 2004/0122674 A1* | 6/2004 | Bangalore | G06F 3/0481 704/276 |
| 2007/0043730 A1* | 2/2007 | Wisely | G06F 17/30864 |
| 2007/0186007 A1* | 8/2007 | Field | G06Q 30/02 709/233 |
| 2009/0030978 A1* | 1/2009 | Johnson | H04N 21/4825 709/203 |
| 2009/0191898 A1* | 7/2009 | Lewis | H04W 4/02 455/456.3 |
| 2009/0304161 A1* | 12/2009 | Pettyjohn | G06Q 30/0603 379/88.01 |
| 2010/0235425 A1* | 9/2010 | Holden | G06F 13/385 709/202 |
| 2010/0235454 A1* | 9/2010 | Holden | G06F 13/385 709/206 |
| 2010/0235552 A1* | 9/2010 | Holden | G06F 13/385 710/72 |
| 2011/0119137 A1* | 5/2011 | Morsa | G06Q 30/02 705/14.71 |

* cited by examiner

METHOD AND APPARATUS OF REQUESTING CUSTOMIZED LOCATION INFORMATION AT A MOBILE STATION

CROSS-REFERENCE TO RELATED APPLICATIONS

The present patent application is a continuation of and claims priority from patent application Ser. No. 14/860,989, titled METHOD AND APPARATUS OF REQUESTING CUSTOMIZED LOCATION INFORMATION AT A MOBILE STATION, filed Sep. 22, 2015, which is a continuation of and claims priority from patent application Ser. No. 14/644,240, titled METHOD AND APPARATUS OF REQUESTING CUSTOMIZED LOCATION INFORMATION AT A MOBILE STATION, filed Mar. 11, 2015, now issued U.S. Pat. No. 9,143,895, which is a continuation of and claims priority from patent application Ser. No. 13/731,169, titled METHOD AND APPARATUS OF REQUESTING CUSTOMIZED LOCATION INFORMATION AT A MOBILE STATION, filed Dec. 31, 2012, now issued U.S. Pat. No. 8,983,503, which is a continuation of and claims priority from patent application Ser. No. 12/941,342, titled METHOD AND APPARATUS OF REQUESTING CUSTOMIZED LOCATION INFORMATION AT A MOBILE STATION, filed Nov. 8, 2010, now issued U.S. Pat. No. 8,412,235, the entire contents of each of which are enclosed by reference herein in their entirety.

TECHNICAL FIELD OF THE INVENTION

This invention relates to a method and apparatus of providing users of mobile stations with geographically relevant information in response to the users' requests.

BACKGROUND OF THE INVENTION

As a convenience for users operating mobile stations, and as an opportunity for marketers and wireless service providers, the process of providing geographically relevant information to those mobile stations is an increasingly popular service. The relevancy and/or accuracy of the marketing information is an important factor in the overall users' satisfaction when operating their mobile stations.

Conventional attempts to provide mobile advertising and directory assistance information to mobile stations offer limited convenience to the users. For instance, a user of a mobile station operating within a predefined geographical area does not normally need information about store locations and/or savings opportunities from geographical areas outside of a given radius. Furthermore, delivery of such advertising information must be simple and easy for the user to access.

Existing services also fail to provide practical distribution channels for publishing advertising and directory assistance information for retrieval by a mobile station. Location-specific mobile advertising and related directory information must be provided to mobile stations in an interactive and simple manner. Furthermore, the accuracy of such information may be increased by a simple and interactive automated voice response menu that the user may access via his or her mobile station.

SUMMARY OF THE INVENTION

One embodiment of the present invention may include a method of processing a call. The method may include receiving a request at a server for dealer information, determining whether there is user preference information and user location information included in the request, searching a database for at least one dealer based on the user preference information and the user location information, and transferring the at least one dealer information to the user.

Another example embodiment of the present invention may include an apparatus configured to process a call. The apparatus may include a receiver configured to receive a request for dealer information. The apparatus may also include a processor configured to determine whether there is user preference information and user location information included in the request, and search a database for at least one dealer based on the user preference information and the user location information. The apparatus may also include a transmitter configured to transfer the at least one dealer information to the user.

DETAILED DESCRIPTION OF THE INVENTION

Figure 1:
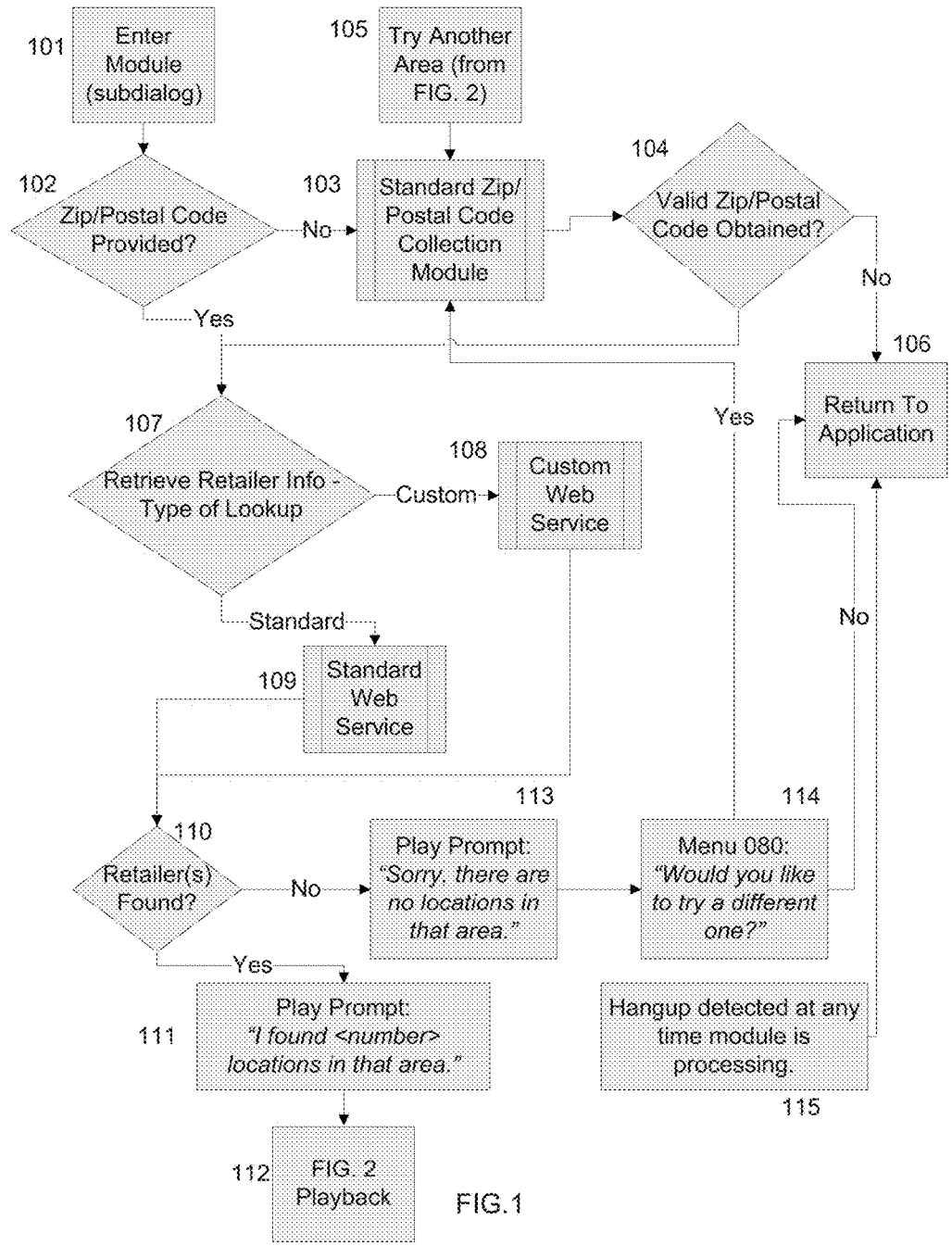
FIG. 1 illustrates an example flow diagram of caller request processing, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention a locator service may provide callers or users of a mobile station with a convenient way to obtain information about businesses and/or specific dealer locations within a given geographical area. The area of interest to the user may be identified by a telephone area code, a town name or identifier and/or a U.S. postal zip code. When a user is present in a particular area and/or decides to acquire information about dealers or other services in that particular area, the user may initiate an application on his or her mobile station in an effort to obtain such information.

One example may include the user initiating a particular application on his or her mobile station, which prompts the user to enter geographical preferences, such as, a zip code, the type of information desired (stores, hotels, restaurants, medical facilities, etc.). The information may be forwarded to a remote server which processes the request, obtains the necessary information and sends the information message back to the user.

The information may be requested by entering text into a graphical user interface (GUI) associated with the user application. Alternatively, the user may be unable to enter the information with his or her hands and may require access to a speech-to-text application or text-to-speech application depending on the circumstances. The requested information may be converted from text to speech and the audio may be forwarded to the user's mobile station. For example, pre-recorded voice slots or TTS (text-to-speech) slots may used to represent a variety of different information and forwarded to the user in the form of a phone call, voice mail, and/or streaming audio. The type of information that can be provided to users/callers may include, but is not limited to, the name of a retailer/dealer, an address, driving directions to a location, a phone number, hours of operation, special offers, coupons, etc. The user may access such an interface via a web page accessible through a web browser or other Internet portal.

The example embodiments described herein are not limited to mobile stations and may be applied to land-line callers, Internet transactions initiated from any computing device (personal computer (PC), handheld computer, server, etc.). Dealers may include, but are not limited to: businesses, retailers, stores, hospitals, parks, services, government affiliates, etc.

According to example embodiments of the present invention, a dealer locator service may provide the user of a mobile station with a variety of information services. Some examples of those services may include providing the user with a number of locations for a given request (i.e., 10 locations may be found for each request), based on a U.S. zip code, Canadian zip code and/or a distance radius. Other examples may include information that is provided to the caller using pre-recorded voice slots and/or text-to-speech (TTS) audio.

Voice slots containing information about each dealer/location may be recorded using a voice talent chosen by the client for the application. Callers may elect to repeat information already heard, listen to information about additionally discovered locations and/or choose to search in a different area by supplying a different zip code. A standard dealer locator module may be part of a remote server that accepts a caller's request message. The caller may input a request by voice and/or touchtone dialed digits, and may not require confirmation of the message's receipt. The request may include user location information and user preference information.

According to example embodiments of the present invention, the standard dealer locator module may use global grammars to recognize utterances made by a caller, such as, "help", "assistant", "agent", "main menu", etc., in addition to the prompt-specific dial-pad or touchtone inputs made on the user's mobile station. Control may be returned to the location application once the user's input command is recognized. The global grammars may be deactivated and/or replaced by a custom grammar designated by a specific application.

The standard dealer locator module may use randomly selected standard apology messages when the caller does not provide input that is recognized. The apology message (e.g. "Sorry, I didn't get that") may be played before the caller is re-prompted to enter an input command or request. A standard zip/postal code module may be used by the standard dealer locator module to identify the inputted postal code and return search results that are within the defined geographical area. The standard zip/postal code module may accept dial-pad touchtone and/or voice input from the caller, and may require confirmation of the inputted information. The standard dealer locator service may be able to utilize a custom web service to obtain dealer information as needed. Such a web service may provide a way to support Canadian postal codes as well as U.S. zip codes.

A database may be used to store and access various information on area codes, zip codes, and country codes, according to example embodiments of the present invention. Other information provided by the database may include city names, states, countries, longitude, latitude, time-zones, etc. In operation, the status returned from the database may include an "OK" that the requested record was found and returned, a "NONE" that the requested record was not found, an "ERROR" that the request was not understood, and/or a "TIMEOUT" that the request was not received. An example of a "TIMEOUT" message would indicate that a response was not received within an acceptable amount of time, typically, a number of seconds upon expiration would result in a "TIMEOUT" indication message.

A dealer locator service may be accessed per a caller's request. The service may be an application operating a particular server and accessed via a port number "xxxx" on the server. The dealer locator service utilizes a database that resides on the same or a remote server, which performs the appropriate calculations and database requests to locate the dealer or dealers within the requested proximity.

Example of status commands returned from the dealer locator service may include "OK" found dealer(s) within requested range, "NONEFOUND" no dealers were found within the radius specified, "INVALID" invalid zip code (not found in table), "BADNUM" not a 5 digit zip code, "BADTYPE" the key type must be specified as ZIP or number plan area (NPA) (i.e., area code "XYZ"), "BADRAD" bad radius, it must be a number, "INVTABLE"

the specified table was not found in the database, "TIM-EOUT" a network timeout was detected, etc.

FIG. 1 illustrates an example flow diagram of caller request processing, according to example embodiments of the present invention. Referring to FIG. 1, a caller may request dealer information by accessing an application or calling a telephone number via his or her mobile station. Initially, the caller's request is received at operation 101 where the user request enters the application module function. The application module determines whether there is a zip code included in the request at operation 102. If the zip code is not included, a postal code collection module will be accessed to obtain a zip code by initiating a caller prompt request, at operation 103. The zip code will be examined for accuracy at operation 104 and a return to application operation is performed at operation 106. If the zip code was received the dealer lookup operation will begin at operation 107.

Operation 107 of FIG. 1 determines whether the type of lookup operation to be performed is a custom or standard type of operation. Depending on the type of operation, a custom or standard web service will be accessed at operations 108 and 109, respectively. The lookup operation may be performed based on a telephone number, which may be provided by the user, retrieved from a database user account record, and/or extracted from automatic number identification (ANI) services (ANI information, etc.). A determination as to whether the web service is custom or standardized may be performed at the time the application is created for a specific client purpose. The standard web service retrieves data from a pre-populated database. A custom web service may be used for a particular client application where the customer does not desire to have their client data stored in a database operated by a third party, or, where the client's data is not compatible with a particular dealer locator lookup service.

The search is then performed for the dealer(s) based on the user's selections, at operation 110. If no dealer is found, then a prompt is played for the user, such as, "sorry, there are no dealers in that area", at operation 113. The caller may then be prompted to try another search request at operation 114, and the application is restarted at operation 106.

When a dealer is located based on the callers request, a message may be played for the caller, such as, "I found "X" number of dealers", before providing additional options for selecting any one or more of those results, at operation 111. Additional options provided by the continuation of call handling procedures in FIG. 2 may also be accessed at operation 112. If a hangup of the call is detected at any time, the application may be restarted at operation 106. Certain options from the operations provided in FIG. 2 may also restart the application process illustrated in FIG. 1, at operation 105.

Figure 2:
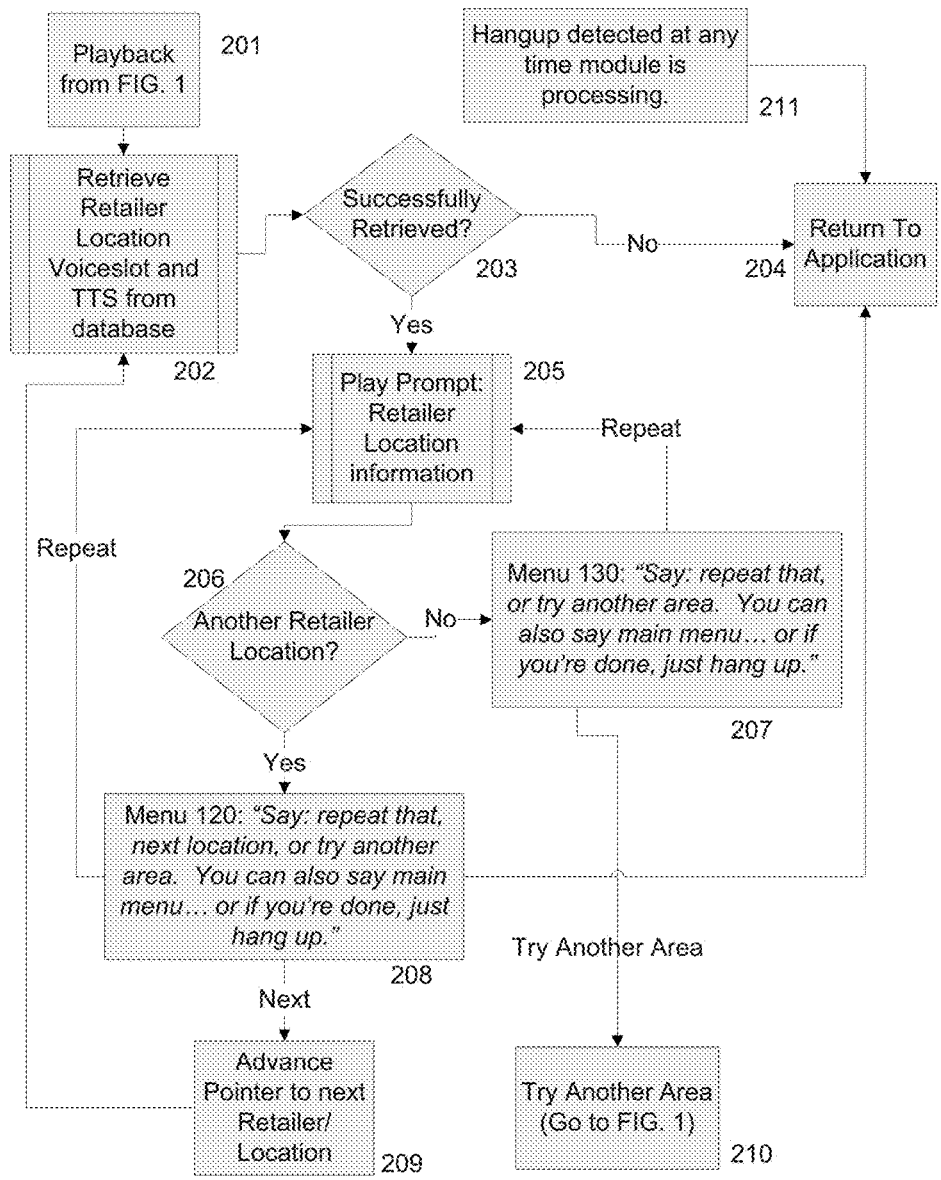
FIG. 2 illustrates another example flow, diagram of caller request processing, according to example embodiments of the present invention.

FIG. 2 illustrates additional menu options according to example embodiments of the present invention, Referring to FIG. 2, beginning with operation 112 of FIG. 1, the dealer information may be retrieved based on the caller's preferences and/or selections and a text-to-speech (TTS) application may also be used to play the audio information to the caller, at operation 202. The text-to-speech application may be enabled when a timeslot is unavailable. If the information is successfully retrieved at operation 203, then the dealer location information and related information may then be played to the caller, at operation 205.

Once the caller has received the requested information, the caller may then opt to hear additional information about dealers at operation 206. If the user selects to hear additional dealer information, the message may be played, such as, "repeat that, next location, or try another area." The user can also say "main menu", or, the user is done, "just hang up", at operation 208. Alternatively, if the caller does not have additional dealers to explore, the same menu option may be offered, at operation 207. If the user has additional dealers to explore, those next dealers/locations may be accessed, at operation 209. The user's location may be automatically determined and applied to the location-based operations via a GPS enabled device, such as, the user's mobile station. If the user wants to start over with a new location, the menu options of FIG. 1 may be accessed via operation 210. If a hangup is detected at any time the call is finished, at operation 211.

Figure 3:
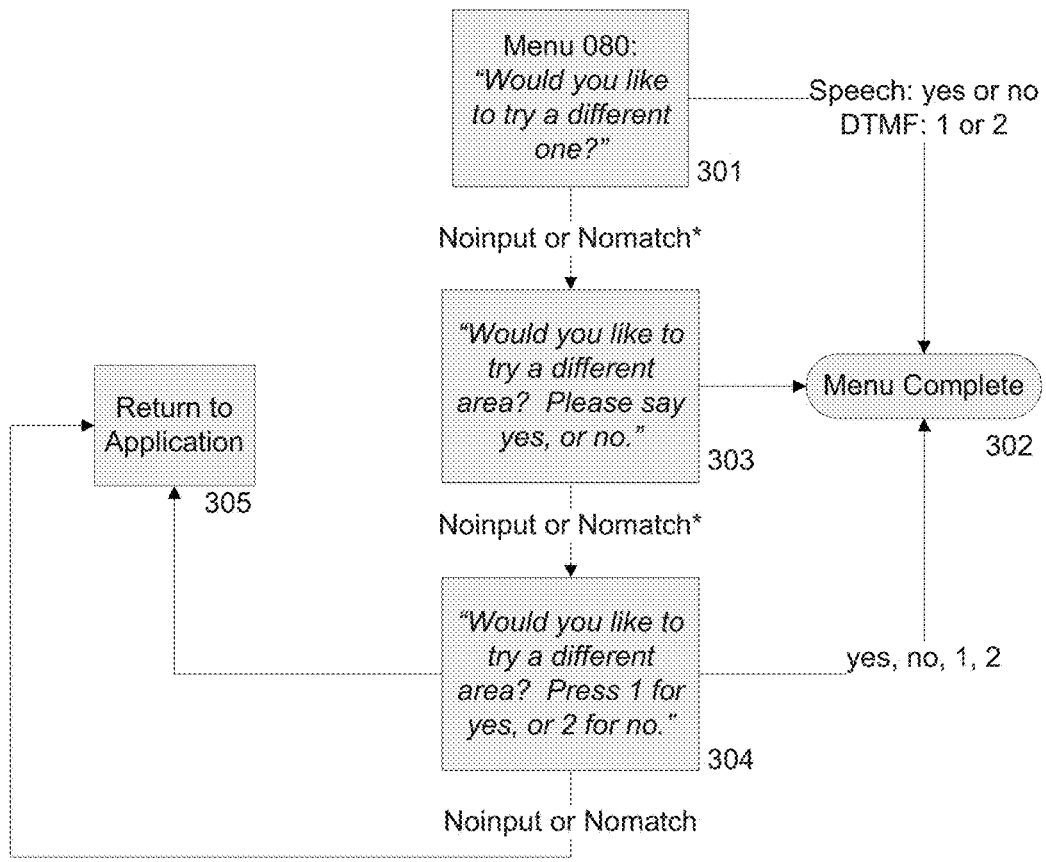
FIG. 3 illustrates an example flow diagram of caller voice and interactive response processing, according to example embodiments of the present invention.

FIG. 3 illustrates examples of the voice processing audio and user feedback provided in the example dealer location menus, according to example embodiments of the present invention. Referring to FIG. 3, following from operation 114 of FIG. 1, when the caller is prompted with an audio message of "would you like to try a different one?", the caller may respond by voice and/or touch pad dual tone multiple frequency (DTMF) signaling (phone buttons), at operation 301. When a no-input or no-match response is received, additional options may be randomly selected, such as, offering touch pad options instead of voice recognition response options and vice versa, at operations 303 and 304. When a user response is recognized, the menu options are complete, at operation 302. There is a return to application operation performed when no response is received or the selections are completed, at operation 305.

Figure 4:
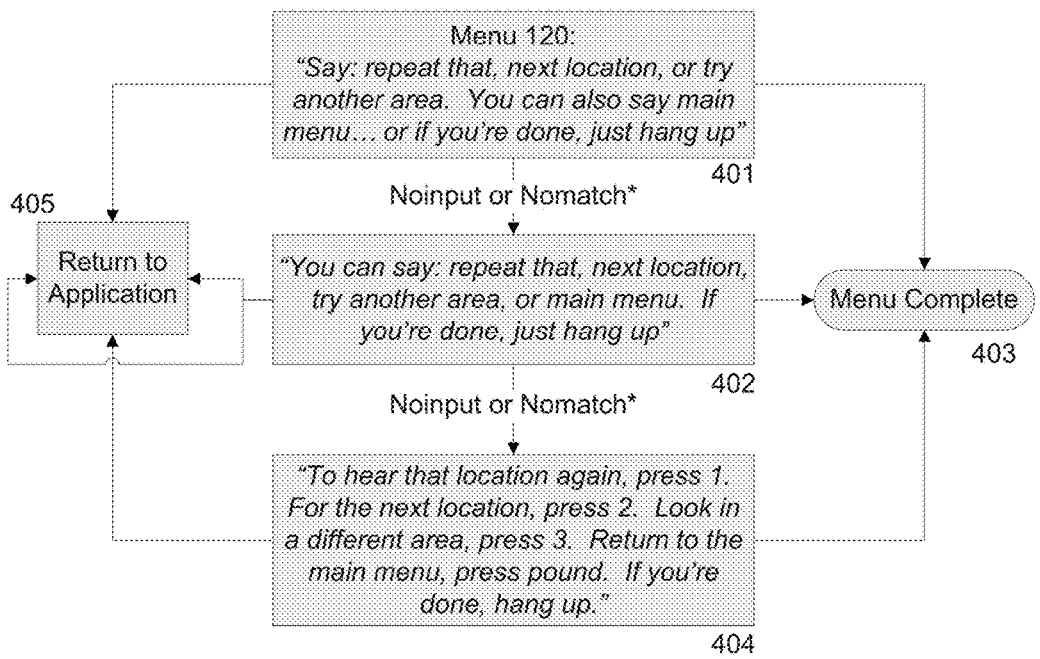
FIG. 4 illustrates another example flow diagram of caller voice and interactive response processing, according to example embodiments of the present invention.

FIG. 4 illustrates examples of the voice processing audio and user feedback provided in the example dealer location menus, according to example embodiments of the present invention. Referring to FIG. 4, following from operation 208 of FIG. 2, when the caller is prompted with an audio message of "repeat that, next location, or try another area", the caller may respond by voice and/or touch pad DTMF signaling (phone buttons), at operation 401. When a no-input or no-match response is received, additional options may be randomly selected, such as, offering touch pad options instead of voice recognition response options and vice versa, at operations 402 and 404. When a user response is recognized, the menu options are complete, at operation 403. There is a continuation with the call logic operations performed when no response is received or the selections are completed, at operation 405. For example, the client application may return the caller to the main menu, transfer the caller to an agent, and/or play a "goodbye" message before disconnecting the caller, etc.

Figure 5:
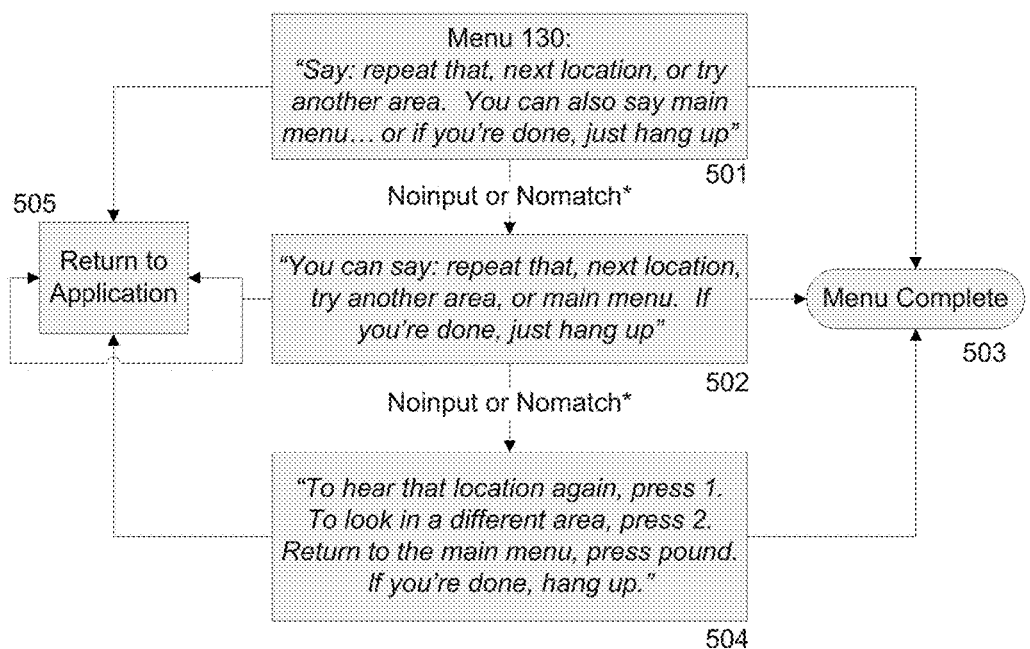
FIG. 5 illustrates yet another example flow diagram of caller voice and interactive response processing, according to example embodiments of the present invention.

FIG. 5 illustrates examples of the voice processing audio and user feedback provided in the example dealer location menus, according to example embodiments of the present invention. Referring to FIG. 5, following from operation 207 of FIG. 2, when the caller is prompted with an audio message of "repeat that or try another area", the caller may respond by voice and/or touch pad DTMF signaling (phone buttons), at operation 501. When a no-input or no-match response is received, additional options may be selected, such as, offering touch pad options instead of voice recognition response options and vice versa, at operations 502 and 504. When a user response is recognized, the menu options are complete, at operation 503. There is a return to application operation performed when no response is received or the selections are completed, at operation 505.

The operations of a method or algorithm described in connection with the embodiments disclosed herein may be embodied directly in hardware, in a computer program executed by a processor, or in a combination of the two. Additionally, multiple separate computer software programs may be implemented and linked together to form a series of programs performing respective subsets routines and operations.

A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. Multiple databases and/or storage mediums may be used to store the computer programs, and may incorporate replication to ensure system stability. The processor and the storage medium may reside in an application specific integrated circuit ("ASIC"). In the alternative, the processor and the storage medium may reside as discrete components. For example FIG. 6 illustrates an example network element 600, which may embody and incorporate any of the above-described application features.

Figure 6:
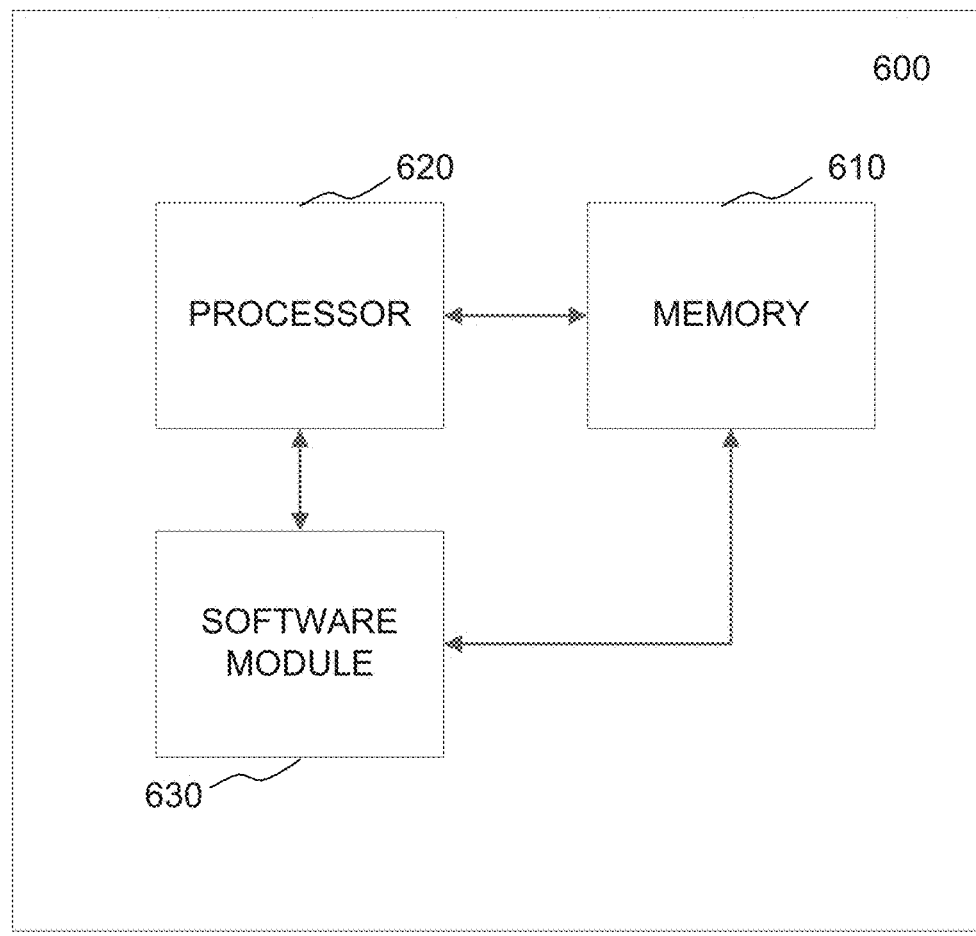
FIG. 6 illustrates an example network entity configured to perform the features of the applications and related call processing modules, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   receiving a request at a server for business information from an application on a user's wireless device;
   when at least one of user preference information and user location information are not included in the request, prompting the user, by the server, via the user's wireless device, for the information, the information for the business related to the user preference information and the user location information;
   searching a database for the business based on the user preference information and the user location information;
   after the user has received the business information, receiving a request for additional business information from the user, via the user's wireless device, and providing the user with the additional business information comprising at least one location for a business proximate to the predefined area; and
   transferring the business information, by the server, via the user's wireless device, to the user via a voice call, streaming audio, a text-to-speech application, or any combination thereof;
   wherein when there are no businesses located within a predefined area of a location identified by the user location information, prompting the user to try another search request.

2. The method of claim 1, wherein the user location information comprises a zip code, an area code, a Global Positioning System (GPS) determined user location, or any combination thereof.

3. The method of claim 1, wherein the additional business information is stored in the database.

4. The method of claim 3, wherein the additional business information comprises different location business information.

5. The method of claim 1, wherein the request is sent as a voice command and processed as a speech-to-text application.

6. An apparatus, comprising:
   a receiver configured to receive a request for business information from an application on a user's wireless device;
   a processor configured to:
      prompt the user, via the user's wireless device, for the information when at least one of user preference information and user location information is not included in the request, the business information related to the user preference information and the user location information,
      search a database for the business based on the user preference information and the user location information, and
      receive a request for additional business information from the user, via the user's wireless device, and provide the user with the additional business information that comprises at least one location for a business proximate to the predefined area after the user has received the business information; and
   a transmitter configured to transfer the business information to the user, via the user's wireless device, via a voice call, streaming audio, a text-to-speech application, or any combination thereof;
   wherein the processor is configured to prompt the user to try another search request when there are no businesses located within a predefined area of a location identified by the user location information.

7. The apparatus of claim 6, wherein the user location information comprises a zip code, an area code, a Global Positioning System (GPS) determined user location, or any combination thereof.

8. The apparatus of claim 6, wherein the additional business information is stored in the database.

9. The apparatus of claim 8, wherein the additional business information comprises different location business information.

10. The apparatus of claim 6, wherein the request is sent as a voice command and processed as a speech-to-text application.

11. A non-transitory computer readable storage medium comprising instructions for:
   receiving a request at a server for business information from an application on a user's wireless device;
   when at least one of user preference information and user location information are not included in the request, prompting the user, by the server, via the user's wireless device, for the information, the information for the business related to the user preference information and the user location information;

searching a database for the business based on the user preference information and the user location information;

after the user has received the business information, receiving a request for additional business information from the user, via the user's wireless device, and providing the user with the additional business information comprising at least one location for a business proximate to the predefined area; and transferring the business information, by the server, via the user's wireless device, to the user via a voice call, streaming audio, a text-to-speech application, or any combination thereof;

wherein when there are no businesses located within a predefined area of a location identified by the user location information, prompting the user to try another search request.

12. The non-transitory computer readable storage medium of claim 11, wherein the request is sent as a voice command and processed as a speech-to-text application.

13. The non-transitory computer readable storage medium of claim 11, wherein the user location information comprises a zip code, an area code, a Global Positioning System (GPS) determined user location, or any combination thereof.

14. The non-transitory computer readable storage medium of claim 11, wherein the additional business information is stored in the database and comprises different location business information.

* * * * *